United States Patent
Lyons et al.

(10) Patent No.: US 10,136,504 B2
(45) Date of Patent: Nov. 20, 2018

(54) SYSTEMS AND METHODS FOR CONTROLLING AQUATIC LIGHTING USING POWER LINE COMMUNICATION

(71) Applicant: Pentair Water Pool and Spa, Inc., Cary, NC (US)

(72) Inventors: Greg Lyons, Ojai, CA (US); Robert J. Netzel, Sr., Simi Valley, CA (US); Gabriel Perez, North Hollywood, CA (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 15/788,644

(22) Filed: Oct. 19, 2017

(65) Prior Publication Data

US 2018/0049299 A1    Feb. 15, 2018

Related U.S. Application Data (63) Continuation of application No. 15/369,335, filed on Dec. 5, 2016, now Pat. No. 9,807,855.
(Continued)

(51) Int. Cl.
*H05B 37/00* (2006.01)
*H05B 37/02* (2006.01)
(Continued)

(52) U.S. Cl.
CPC ......... *H05B 37/0263* (2013.01); *E04H 4/148* (2013.01); *G09G 3/32* (2013.01);
(Continued)

(58) Field of Classification Search
CPC .. F21K 9/00; F21K 9/23; F21S 48/325; F21S 48/328; H05B 33/0803; H05B 33/0842;
(Continued)

(56) References Cited

U.S. PATENT DOCUMENTS 6,016,038 A   1/2000 Mueller et al.
6,150,774 A   11/2000 Mueller et al.
(Continued)

FOREIGN PATENT DOCUMENTS

AU        757000 B2    1/2003
AU    2003203584 A1    6/2003
(Continued)

OTHER PUBLICATIONS

Aqua Logic and Pro Logic Base Station Installation and Operation Manual for model AQL2-BASE-RF; copyright 2008 Goldline Controls; 8 pages.

*Primary Examiner* — Monica C King
(74) *Attorney, Agent, or Firm* — Quarles & Brady LLP (57) ABSTRACT

In some embodiments of the disclosed subject matter, systems and methods for controlling aquatic lighting using power line communication are disclosed. In some embodiments, the system includes a lighting controller configured to receive power via an AC power line, the lighting controller comprising a light driver circuit configured to be coupled to at least one light source, a first power line modem configured to be connected to a local area network via a second powerline modem and the AC power line, and a processor that is configured to receive, from a user interface via the first power line modem, lighting data corresponding to a lighting selection specified by user input received by the user interface and cause the light driver circuit to drive the at least one light source to present the lighting selection based on the lighting data.

20 Claims, 3 Drawing Sheets

Related U.S. Application Data (60) Provisional application No. 62/264,162, filed on Dec. 7, 2015.

(51) Int. Cl.
  *H04B 3/54* (2006.01)
  *H05B 33/08* (2006.01)
  *G09G 3/32* (2016.01)
  *E04H 4/14* (2006.01)
  *F21W 131/401* (2006.01)

(52) U.S. Cl.
  CPC ......... *H04B 3/542* (2013.01); *H05B 33/0845* (2013.01); *H05B 33/0857* (2013.01); *H05B 37/029* (2013.01); *H05B 37/0272* (2013.01); *F21W 2131/401* (2013.01); *G09G 2320/0626* (2013.01); *G09G 2354/00* (2013.01)

(58) Field of Classification Search
  CPC ............ H05B 33/0863; H05B 33/0869; H05B 37/0245; H05B 33/0815; H05B 33/0818; H05B 33/0821; H05B 33/0872; H05B 33/089
  See application file for complete search history.

(56) References Cited

U.S. PATENT DOCUMENTS

| | | |
|---|---|---|
| 6,166,496 A | 12/2000 | Lys et al. |
| 6,211,626 B1 | 4/2001 | Lys et al. |
| 6,292,901 B1 | 9/2001 | Lys et al. |
| 6,340,868 B1 | 1/2002 | Lys et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,624,597 B2 | 9/2003 | Dowling et al. |
| 6,636,003 B2 | 10/2003 | Rahm et al. |
| 6,717,376 B2 | 4/2004 | Lys et al. |
| 6,720,745 B2 | 4/2004 | Lys et al. |
| 6,774,584 B2 | 8/2004 | Lys et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,897,624 B2 | 5/2005 | Lys et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,014,336 B1 | 3/2006 | Ducharme et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,113,541 B2 | 9/2006 | Lys et al. |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 2008/0197788 A1 | 8/2008 | Conover et al. |
| 2013/0215012 A1 | 8/2013 | Reddy et al. |

FOREIGN PATENT DOCUMENTS

| | | |
|---|---|---|
| CA | 2302227 A1 | 3/1999 |
| DE | 69807092 T2 | 5/2003 |
| DE | 60021911 T2 | 5/2006 |
| DE | 60023730 T2 | 7/2006 |
| EP | 1016062 A1 | 7/2000 |
| EP | 1234140 B1 | 8/2002 |
| EP | 1224845 B1 | 7/2005 |
| HK | 1025416 A1 | 11/2002 |

SYSTEMS AND METHODS FOR CONTROLLING AQUATIC LIGHTING USING POWER LINE COMMUNICATION

CROSS-REFERENCE TO RELATED APPLICATIONS

The present application is a continuation of U.S. application Ser. No. 15/369,335, filed Dec. 5, 2016, and entitled "Systems and Methods for Controlling Aquatic Lighting Using Power Line Communication," which claims priority to U.S. Provisional Application Ser. No. 62/264,162, filed Dec. 7, 2015, both of which are hereby incorporated herein by reference in their entireties for all purposes.

BACKGROUND

Color-changing lights and lighting effects have become very popular in swimming pools and spas. These color-changing lights and lighting effects can produce various lighting shows. These shows can include making it appear as if a certain color is "moving" through or around the pool or spa; for example, from one end of a pool to the other. Further, custom shows can be generated to achieve a unique effect or to define a holiday, e.g., red and green for Christmas, red, white and blue for the Fourth of July, etc. As lighting technologies have gotten more advanced, more complex lighting shows, such as generating still or moving images in a pool or spa, are desirable.

To generate and control lighting shows, such as those described above, color control can be achieved by manually interrupting power to the light's internal microprocessor which activates the color changing mechanism. If the user wants individual control of multiple lights for basic illumination or for color lighting effects, this could require separate, manually activated switches, complicating the design and control of the lighting system. Furthermore, for more complex lighting shows, all of the switches might be required to be manually operated simultaneously, or in complex sequence, which is difficult at best.

Another option is to employ one or more control wires between a lighting controller and the individual lights in the pool or spa. However, running additional control wires can be cost prohibitive when adding a lighting controller to a pool with existing lighting, or replacing a device that controls the lighting using an alternate control technique, similar to that discussed above. For example, skilled electricians may be needed to pull the control wires through the existing conduit or wiring channels. Furthermore, where the existing conduit or wiring channels do not have sufficient room to accommodate additional wiring, new conduit or wiring channels may need to be installed, often requiring a concrete pad surrounding the pool or spa to be cut and re-poured once the installation is complete.

Desired is a way to control lights and other pool/spa equipment in a simple, but entertaining manner that allows for easier installation and upgrading of the lighting controller.

SUMMARY

In accordance with some embodiments of the disclosed subject matter, an aquatic lighting system is provided, the system comprising: a lighting controller configured to receive power via an AC power line, the lighting controller comprising a light driver circuit configured to be coupled to at least one light source, a first power line modem configured to be connected to a local area network via a second powerline modem and the AC power line, and a processor that is configured to receive, from a user interface via the first power line modem, lighting data-corresponding to a lighting selection specified by user input received by the user interface and cause the light driver circuit to drive the at least one light source to present the lighting selection based on the lighting data.

In accordance with some embodiments of the disclosed subject matter, a method for controlling an aquatic lighting system is provided, the method comprising: receiving, at a first power line modem, a linking input from a second power line modem via an AC power line, receiving, from a user interface connected to the first power line modem via the second powerline modem and a local area network, lighting data corresponding to a lighting selection specified by user input received by the user interface, and causing a light driver circuit to drive at least one light source to present the lighting selection based on the received lighting data.

DETAILED DESCRIPTION

Before any embodiments of the disclosed subject matter are explained in detail, it is to be understood that the disclosed subject matter is not limited in its application to the details of construction and the arrangement of components set forth in the following description or illustrated in the following drawings. The disclosed subject matter is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosed subject matter. Various modifications to the illustrated embodiments will be readily apparent to those skilled in the art, and the generic principles herein can be applied to other embodiments and applications without departing from embodiments of the disclosed subject matter. Thus, embodiments of the disclosed subject matter are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

Figure 1:
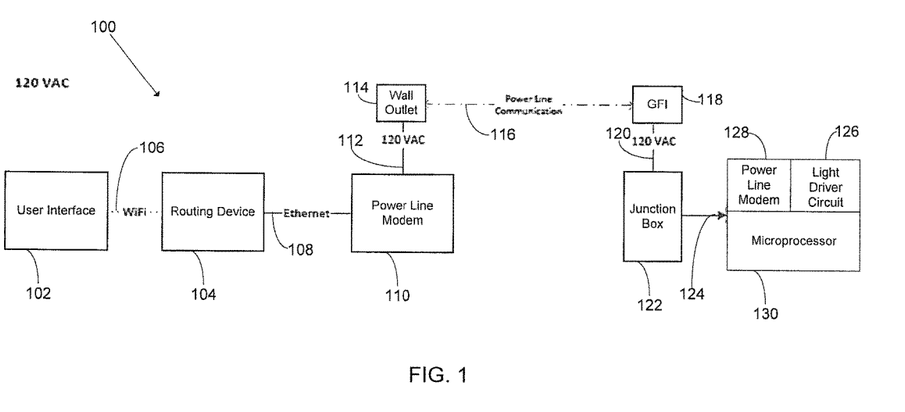
FIG. 1 is a system view of a line voltage AC pool or spa lighting system having power line communication according to one embodiment of the disclosed subject matter.

FIG. 1 illustrates an aquatic illumination system 100 having power line communications. The illumination system 100 can be used in a pool, a spa, or other aquatic applications, such as water features, decorative ponds, etc. The illumination system 100 may be used to display a lighting selection, which may include the transmission of light from, for example, one or more light emitting diodes (LEDs), a light show, a display of an animation, a display of a video, a display of an image, and/or any other suitable transmission or display using any type of light. In one embodiment, the illumination system 100 may have a user interface 102. The user interface 102 can allow a user to select a lighting selection. In one embodiment, the user can select a lighting selection from a plurality of existing lighting selections presented by the user interface 102. Additionally, the user interface 102 can allow a user to create custom lighting selections, for example, light shows. The user interface 102 can, in some embodiments, allow a user to upload images or other media (e.g., videos, images (e.g., gifs), animations, etc.) as well, which can be provided to, and displayed by, the illumination system 100. In some embodiments, a lighting selection can include movements to be performed by one or more light sources in addition to, or in lieu of, controlling the brightness and/or color of the one or more light sources.

The user interface 102 can be a dedicated aquatic system controller, such as an Intellitouch® controller from Pentair Water Pool and Spa, Inc. Alternatively, the user interface 102 can be software based, such that it can be executed by a processor. For example, the user interface 102 could be a software package available for personal computers running operating systems such as Microsoft® Windows®, Mac® OS, Unix, Linux, etc. This can allow a user to use a standard computer as the user interface 102, Optionally, a user can use a mobile computing device as the user interface 102. For example, Android,® iOS,® and Windows® based mobile computing devices, such as smart phones and tablets can be used as the user interface 102. A user can install an Application onto their mobile computing device, for example, the illumaVision® Application from Pentair Water Pool and Spa, Inc. The Application can allow the mobile computing device to function as the user interface 102.

Regardless of what type of user interface is utilized as the user interface 102, the user interface 102 may communicate data to a routing device 104 over a communication link 106. In one embodiment, the communication link 106 can be a wireless communication link, for example, WiFi, Bluetooth®, cellular (3G, 4G, LTE, etc.), or other suitable wireless communication technology. Alternatively, the communication link 106 could be a wired connection, such as Ethernet or other open and/or dedicated communication protocols. The routing device 104 can be a standard local area network (LAN) router for receiving data, and then routing it to a device. In one embodiment, the routing device 104 can receive data from the user interface 102, and then output the received data over dedicated communication link 108 to a power line modem 110.

The communication link 108 can be a hardwired connection, such as an Ethernet or other open and/or dedicated communication protocols. Alternatively, the communication link 108 can be a wireless communication link such as Wi-Fi, Bluetooth®, cellular (3G, 4G, LTE, etc.), or other suitable wireless communication technology.

The power line modem 110 can forward the data received from the routing device 104 and convert the data into a format for transmission over a power line 112. In one embodiment, the power line modem 110 can be a power line data modem manufactured by Bel Fuse.® However, any broadband power line data modem capable of transmitting and receiving data over a power line can be used. In one embodiment, the power line modem 110 can be coupled to an AC power line 112. Optionally, a DC power line may be utilized. The power line modem 110 can, in one embodiment, connect to the AC power line 112 by plugging directly into a standard household power receptacle 114. In one embodiment, the AC power line 112 can be a standard US household power line (i.e., 120V at 60 Hz). However, the AC power line 112 can have an AC voltage of more than 120V or less than 120V, and at a frequency of more than 60 Hz or less than 60 Hz.

The power line modem 110 can receive the data from the routing device 104 such that it can be overlaid with the AC voltage present on the AC power line 112. In one embodiment, the power line modem 110 can send data to, and/or receive data from, the routing device 104 over Ethernet. In some embodiments, the power line modem 110 can encrypt data received from the routing device using any suitable encryption technique or combination of techniques. In some embodiments, the data received from the routing device can be in any suitable protocol such as User Datagram Protocol (UDP), TCP/IP protocol, and/or any other standard communication protocols. The power line modem 110 can transmit data received from the routing device 104 over data/power line 116, which can represent, for example, a pre-programmed lighting selection, a custom lighting selection, an animation, etc. While data/power line 116 is shown to be a single line, the data transmitted by the power line modem 110 can be transmitted over all of the AC wiring network upstream of the household power receptacle 114. The power line modem 110 can transmit the received data over the data/power line 116 at any suitable frequency that is typically much higher than the frequency of the power signal being transmitted over data/power line 116. For example, the power line modem 110 can transmit the data at one or more frequencies in the range of 1.8-250 MHz.

The data/power line 116 can terminate at load switch 118. In one embodiment, load switch 118 can be a GFCI outlet. In another embodiment, load switch 118 can be a GFCI circuit breaker. Power/communication line 120 can provide AC power and communication data from the load switch 118 to a junction box 122. The junction box 122 can provide wiring terminations for the power/communication line 120. The junction box 122 can also include a disconnect switch or other control devices. The junction box 122 can provide connection points to provide a power/data line 124 to a lighting controller 126. In one embodiment, the lighting controller 126 can be an Illumavision™ controller from Pentair Water Pool and Spa, Inc.

The lighting controller 126 can include a power line modem 128. In one embodiment, the power line modem 128 can be a power line data modem manufactured by Bel Fuse®. However, any power line data modem capable of transmitting and receiving data over a power line can be used. The power line modem 128 can process the data being transmitted over the power/data line 124 and isolate the data from the AC power signal. The power line modem 128 can then transmit the data to a processor 130 of the lighting controller 126 for processing. The processor 130 can process the data to determine lighting control data based on which lighting selection was input into the user interface 102. The processor 130 can then provide output to a light driver circuit 132 to generate the lighting selection. Although the power line modem 128 is shown as being integrated into the lighting controller 126, the power line modem 128 can be a separate device coupled to the lighting controller 126. Additionally, as described above, the light controller 126 can change an orientation at which the light is emitted by the one or more light sources coupled to the light driver circuit 132. In some embodiments, the orientation of the emitted light can be controlled using any suitable technique, such as through actuation of one or more motors the control the physical orientation of the light source, one or more motors that control optics (e.g., a lens, a mirror, etc.), a digital micromirror device, etc.

In some embodiments, the light driver circuit 132 can include circuitry to drive a plurality of light source(s), such as LEDs, and/or any other display device, such as a projector device. In such embodiments, light driver circuit can drive the light source(s) to produce, for example, images, videos, animations, etc. The light driver circuit 132 can control the plurality of light sources by controlling the color, intensity, duty cycle, etc., of one or more of the plurality of lights to generate a lighting selection. Alternatively, the light driver circuit 132 can control a plurality of light sources in addition to a projection mechanism, to produce visual images. In one embodiment, the visual images can be still images. In a further embodiment, the visual images can be moving images, such as recorded video, one or more gifs, an animation, etc. The visual images can be transmitted to the lighting controller 126 via the power line modem 128, which can receive the visual images from the power line modem 110.

In some embodiments, the lighting controller 126 can be pre-programmed with any suitable lighting data in memory (not shown). For example, instructions for driving one or more lights can be stored in memory corresponding to various lighting shows. In such an example, the user interface 102 can present the various lighting shows for selection by a user. In response to a selection of one of these pre-programmed lighting shows, the user interface 102 can transmit information to the lighting controller 126 via the power line modem 110 and the power line modem 128 indicating which of the pre-programmed lighting shows has been selected. In some embodiments, the user interface 102 can be used to create or select a light show that is not pre-programmed on the lighting controller 126. For example, the user interface 102 can be used to specify a light show and/or select a light show that is available for download through the user interface 102. In such an example, the user interface 102 can transmit instructions that can be used by the lighting controller 126 to perform the light show to the lighting controller 126 via the power line modem 110 and the power line modem 128. In some embodiments, the user interface 102 can be used to select media content, such as one or more videos, still images, gifs, animations, etc., to be presented by the lighting controller 126. In such embodiments, the user interface 102 can be used to upload media content to the lighting controller 126 by transmitting the media content to the lighting controller 126 via the power line modem 110 and the power line modem 128. Additionally or alternatively, in some embodiments, the user interface 102 can be used to select media content that is available from a remote source (e.g., a remote server, a web page, etc.) and/or from a local source (e.g., network attached storage, another computing device connected to the local network, etc.). In such embodiments, the user interface 102 can transmit information identifying how to obtain the media content (e.g., a URL, an address on the local area network where the media content is stored, login credentials, etc.) to the lighting controller 126 via the power line modem 110 and the power line modem 128. In such an embodiments, the lighting controller can download and/or stream the selected media content from the device on which the media content is stored based on the information received from the user interface.

Further, the lighting controller 126 can include a power supply for converting the AC power to a DC power suitable for powering the processor 130 and the light driver circuit 132, as well as any other suitable components within the lighting controller 126. In one embodiment, the power supply can convert the AC power to a DC power by converting the AC voltage (e.g., 120V, 60 Hz) to a 22V DC voltage. Further, the power supply can also convert the AC voltage to other suitable DC voltages, such as 5VDC, −5VDC, 24VDC, etc.

In some embodiments, the lighting controller 126 can be placed in a sealed, underwater enclosure. In one embodiment, the lighting controller 126 can be placed in an underwater pool light housing. Alternatively, multiple lighting controllers 126 can be placed in multiple, individual pool light housings. The lighting controller 126 can also be located in a spa light housing, or other aquatic light fixtures as found in fountains, decorative ponds, etc. In some embodiments in which there are multiple of the lighting controllers 126, the user interface 102 can receive separate inputs to select individual lighting selections for different of the lighting controllers 126 and/or can receive input to select a lighting selection that can be used by multiple of the lighting controllers 126 to collectively present the lighting selection. In some embodiments, user interface 102 can address different lighting selection information to different of the lighting controllers 126 using any suitable technique or combination of techniques. For example, the user interface 102 can address lighting data to a particular lighting controller using the IP address and/or MAC address of the lighting controller 126 for which the lighting selection has been made. In some embodiments, the user interface 102 can present a lighting controller 126 that has been paired with power line modem 110.

The power line modem 110 and the power line modem 128 can both receive and transmit data over an AC power line. Due to the nature of AC power transmission, this data would not be limited to a utility end user, but would be available to others connected to the same AC grid, located within a certain distance of a power line modem. In order to prevent unauthorized users from gaining access to the data, or an ability to control a user's lighting selection, the power line modem 110 and the power line modem 128 can be paired to each other using a unique security key. In one embodiment, the power line modem 110 and the power line modem 128 can be paired using the unique security key at the manufacturing facility, prior to being provided to a customer. Alternatively, a user can configure the unique security key once the power line modems 110, 128 have been installed.

In one embodiment, the power line modem 110 and the power line modem 128 can each have an input which can direct the power line modem to pair with another power line modem to generate a unique security key. The input may be required to be triggered simultaneously between multiple power line modems. Alternatively, the input of each of the power line modems may be required to be triggered within a given period of time of each other. For example, the inputs on the multiple power line modems may need to be each be triggered within 5 minutes, 1 minute, or 30 seconds, of each other. However, the time can be less than 30 seconds or more than 5 minutes, as required for a given application.

Generally, an actuator (e.g., button) can be located on a power line modem, and can be used to trigger the input. However, in some embodiments, it is not feasible to have an actuator located on the power line modem, such as when the power line modem is installed in an underwater lighting fixture. In this instance, a separate device can be used to activate the input. In one embodiment, the power line modem 128 can have the input coupled to a hall effect sensor (not shown). A user can then place a magnet (not shown) in close proximity to the hall effect sensor, which can trigger the input on the power line modem 128, thereby allowing the power line modem 128 to pair with another power line modem, such as the power line modem 110. The distance required to activate the hall effect sensor can be about 10 cm. Alternatively, the distance required to activate the hall effect sensor can be more than about 10 cm or less than about 10 cm, for example, but to about 30 cm. Further, the required distance can vary based on the material surrounding the hall effect sensor, the position of the hall effect sensor within an aquatic light housing, the strength of the magnet, etc. In an alternative embodiment, a reed switch could be used in place of a hall effect sensor. A user could place a magnet in close proximity to the reed switch, thereby closing or opening an electrical circuit to trigger the input.

Figure 2:
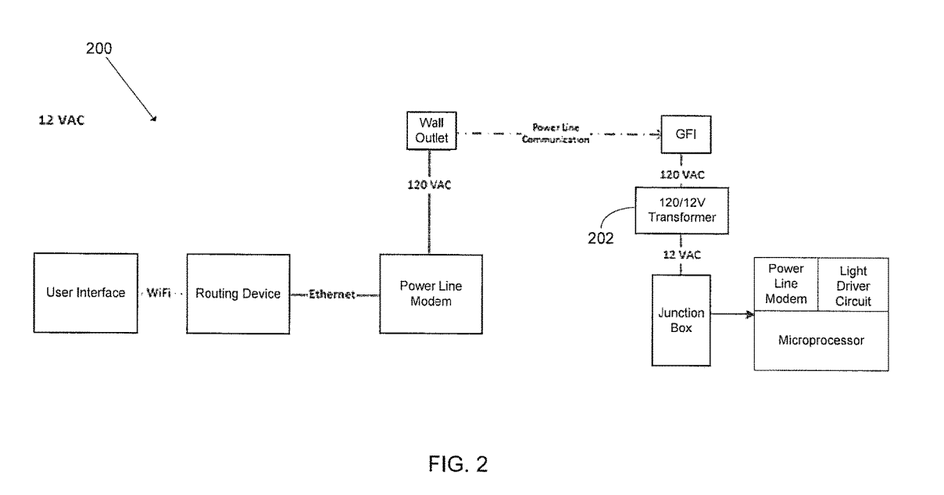
FIG. 2 is a system view of a line voltage AC pool or spa lighting system having power line communication according to another embodiment of the disclosed subject matter.

FIG. 2 illustrates an aquatic illumination system 200 having power line communications, similar to that shown in FIG. 1. However the aquatic illumination system 200 can include an AC transformer 202. The AC transformer 202 can transform one AC voltage into a different AC voltage. For example, the AC transformer 202 can transform 120V AC into 12V AC. However, any type of AC transformer could be used, with any coil ratio, as required for a given application. Although FIG. 2 shows the AC transformer 202 being located between the ground fault interrupter and the junction box, the transformer can be located at any suitable location, such as between the wall outlet and the ground fault interrupter.

Figure 3:
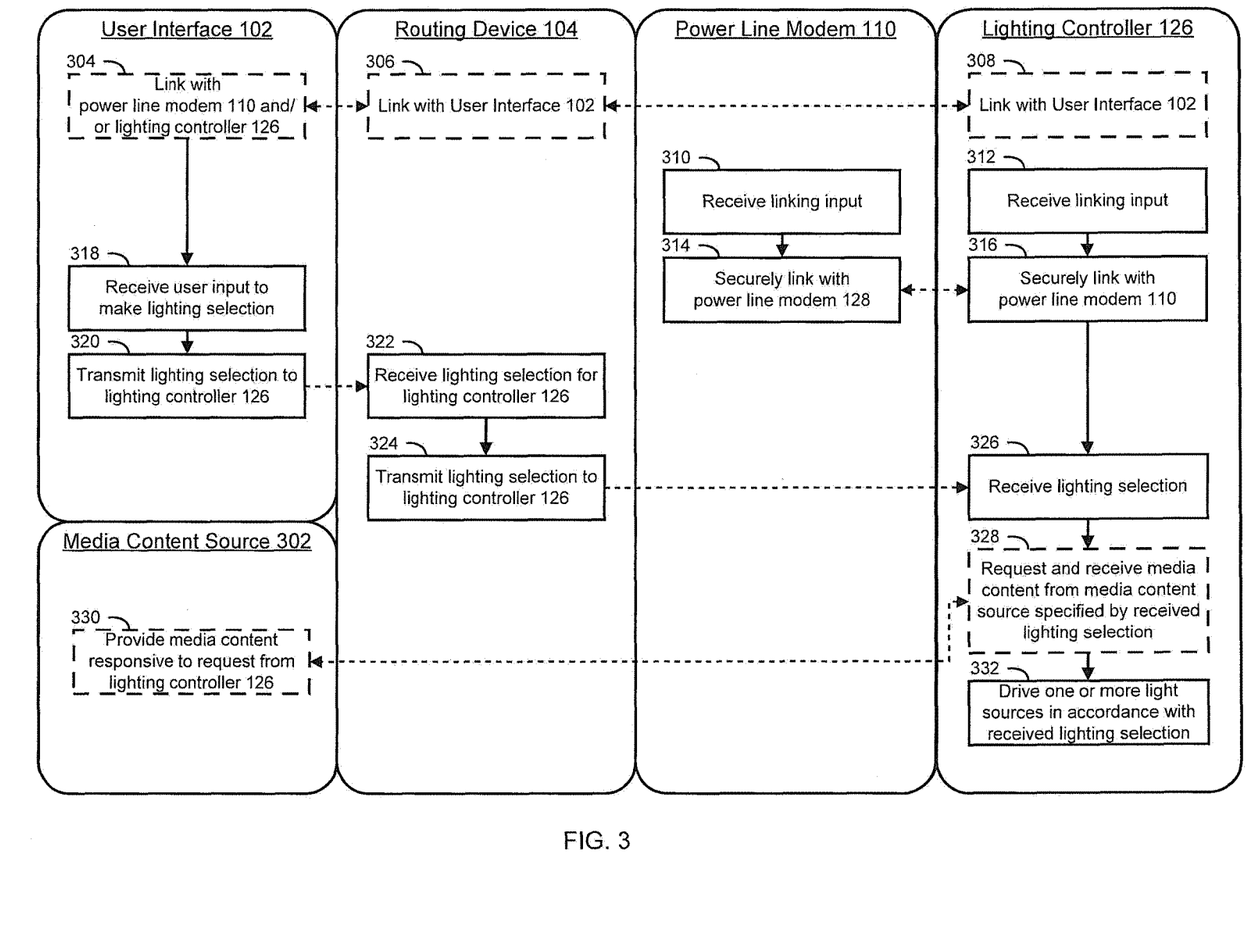
FIG. 3 is an information flow for controlling an aquatic lighting system in accordance to some embodiments of the disclosed subject matter

FIG. 3 illustrates an information flow for controlling an aquatic lighting system in accordance to some embodiments of the disclosed subject matter. As shown in FIG. 3, in some embodiments, at 304, the user interface 102 can link with the routing device 104 and/or light controller 126 prior to being capable of transmitting lighting data to the lighting controller 126 via the power line modem 110. The user interface 102 can use any suitable technique or combination of techniques to link with the routing device 104 and/or the lighting controller 126. For example, the user interface 102 can search for a local area network (e.g., as provided by the routing device 104) and can be used to provide any suitable credentials for joining the local area network (e.g., by connecting to the rouging device 104). As another example, the user interface 102 can search the local area network to which it is connected (e.g., through the routing device 104) using any suitable discovery protocol to discover available lighting controllers, such as the Simple Service Discovery Protocol (SSDP). Additionally or alternatively, a user can be prompted to enter identifying information that can be used to locate the lighting controller 126, such as an IP address assigned to the lighting controller 126, a media control access (MAC) address of the lighting controller, 126, and/or any other suitable information. In some embodiments, the user interface 102 may not be able to link with the lighting controller 126 until the power line modem 128 becomes linked with the power line modem 110 (e.g., as described below in connection with 310-316). In some embodiments, a user may be required to enter credentials (e.g., a username, a password, a passcode, a key, etc.) in order to link to the power line modem 110 and/or the lighting controller 126.

At 306, in some embodiments, the routing device 104 can link with the user interface 102. In some embodiments, the routing device 104 can link with the user interface 102 using any suitable technique or combination of techniques. For example, in some embodiments, the routing device 104 can respond to a request from the user interface 102 to connect to the routing device 104.

At 308, the lighting controller 126 can link with the user interface 102. In some embodiments, the lighting controller 126 can link with the user interface 102 using any suitable technique or combination of techniques. For example, in some embodiments, the lighting controller 126 can respond to a discovery request from the user interface 102.

At 310, the power line modem 110 can receive a linking input that can place the power line modem 110 into a linking mode in which it can be securely linked with another power line modem (e.g., the power line modem 128). As described above, the linking input can be provided by actuating a user input, such as a physical button or a hall effect sensor. Additionally, or alternatively, in some embodiments, the linking input can be provided through the user interface 102.

At 312, the power line modem 128 of the lighting controller 126 can receive a linking input that can place the power line modem 110 into a linking mode in which it can be securely linked with another power line modem (e.g., the power line modem 128). As described above, the linking input can be provided by actuating a user input, such as a physical button or a hall effect sensor. Additionally, or alternatively, in some embodiments, the linking input can be provided through the user interface 102. At 314 and 316, in response to both the power line modem 110 and/or the power line modem 128 receiving an appropriate input within a predetermined period of time (e.g., as described above), the power line modem 110 can securely link with the power line modem 128 by, for example, generating and/or exchanging a security key, a pair of security keys, etc. (e.g., as described above in connection with FIG. 1). As described above, the power line modem 110 and the power line modem 128 can be linked at any suitable time, such as prior to shipping, during installation, after installation, etc.

At 318, the user interface 102 can receive user input to make a lighting selection. As described above in connection with FIG. 1, the lighting selection can be any suitable selection, such as a selection from among light shows pre-programmed into the lighting controller 126, a selection of a custom light show, a selection of a light show that can be downloaded to the lighting controller 126 (e.g., from a web page, from an application, etc.), a selection of media content to use in a light show, etc.

At 320, the user interface 102 can transmit lighting data representing the lighting selection to the lighting controller 126 via the local area network (e.g., routing device 104) and the power line modem 110. As described above, the lighting data can be transmitted using any suitable protocol, and can be any suitable data such as identifying information of a pre-programmed light show, instructions for presenting a light show, media content, identifying information of an address where media content can be retrieved, any other suitable data, or any suitable combination thereof.

At 322, the routing device 104 can receive the lighting data representing the lighting selection sent from the user interface 102 that is for the lighting controller 126, and at 324 can transmit the lighting selection to the lighting controller 126 over at least one AC power line via the power line modem 110. As described above, the power line modem 110 can transmit the data over the AC power line using any suitable protocol and/or any suitable frequency.

At 326, the lighting controller 126 can receive the lighting data representing the lighting selection sent from the user interface 102 (e.g., using the power line modem 128). At 328, in situations in which the lighting data indicates that the lighting controller 126 is to download and/or stream media content, the lighting controller 126 can request and receive the media content from a media content source 302 via the power line modem 110 and the local area network (e.g., via the routing device 104). As described above, the media content source 302 can be any suitable device, such as a remote server, network attached storage coupled to the local area network, a computing device connected to the local network, etc. At 330, the media content source 302 can receive the request for the media content, and can provide the requested media content to the lighting controller 126 via the local area network and the power line modem 110.

At 332, as described above in connection with FIG. 1, the lighting controller 126 can drive one or more light sources in accordance with the lighting selection made at 318 using the user interface 102.

Any of the features of any of U.S. application Ser. No. 13/533,966, filed Jun. 26, 2012, and entitled "Underwater Image Projection Display System and Lighting Control System and Device", U.S. application Ser. No. 13/626,867, filed Sep. 25, 2012, and entitled "Underwater Image Projection Controller with Boundary Setting and Image Correction Modules and Interface and Method of Using Same", U.S. application Ser. No. 13/769,813, filed Feb. 18, 2013, and entitled "Underwater Image Projection Display System, Lighting Control System and Device and Method of Operating Same", U.S. application Ser. No. 13/626,871, filed Nov. 9, 2012, and entitled "Multidimensional Rotary Motion Apparatus Moving a Reflective Surface and Method of Operating Same", U.S. application Ser. No. 13/957,418, filed Aug. 1, 2013, and entitled "Multidimensional Rotary Motion Apparatus Moving a Reflective Surface and Method of Operating Same", U.S. application Ser. No. 14/618,946, filed Feb. 10, 2015, and entitled "Underwater Image Projection System and Method", and U.S. application Ser. No. 13/089,601, filed Apr. 19, 2011, and entitled "Apparatus and Method for Controlling and Supplying Power to Electrical Devices in High Risk Environments", may be incorporated within the embodiments disclosed herein. The disclosures of each of the foregoing applications are hereby incorporated herein by reference in their entireties.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

The invention claimed is:

1. An aquatic lighting system, comprising:
a lighting controller configured to receive power via an AC power line, the lighting controller comprising:
a light driver circuit configured to be coupled to at least one light source;
a first power line modem configured to be connected to a local area network via a second powerline modem and the AC power line;
a processor that is configured to:
receive, from a user interface via the first power line modem, lighting data corresponding to a lighting selection specified by user input received by the user interface; and
cause the light driver circuit to drive the at least one light source to present the lighting selection based on the lighting data.

2. The system of claim 1, wherein the lighting controller is configured to project light while submerged underwater.

3. The system of claim 1, wherein the user interface is a computing device.

4. The system of claim 1, wherein the lighting data comprises identifying information of the lighting selection.

5. The system of claim 4, wherein the identifying information corresponds to a light show pre-programmed into the lighting controller.

6. The system of claim 4, wherein the identifying information comprises an address at which media content is available.

7. The system of claim 6, wherein the processor is further configured to stream the media content from the address.

8. The system of claim 6, wherein the processor is further configured to download the media content from the address.

9. The system of claim 1, wherein the lighting data comprises image data uploaded to the lighting controller from the user interface, the image data corresponding to the lighting selection.

10. The system of claim 1, wherein the at least one light source comprises a light emitting diode.

11. A method for controlling an aquatic lighting system, the method comprising:
receiving, at a first power line modem, a linking input from a second power line modem via an AC power line;
receiving, from a user interface connected to the first power line modem via the second powerline modem and a local area network, lighting data corresponding to a lighting selection specified by user input received by the user interface; and
causing a light driver circuit to drive at least one light source to present the lighting selection based on the received lighting data.

12. The method of claim 11, further comprising causing the at least one light source to project light while submerged underwater.

13. The method of claim 11, wherein the user interface is a computing device.

14. The method of claim 11, wherein the lighting data comprises identifying information of the lighting selection.

15. The method of claim 14, further comprising causing the light driver circuit to present a pre-programmed light show specified by the identifying information.

16. The method of claim 14, wherein the identifying information comprises an address at which media content is available.

17. The method of claim 16, further comprising streaming the media content from the address.

18. The method of claim 16, further comprising downloading the media content from the address.

19. The method of claim 11, wherein receiving the lighting data further comprises receiving image data uploaded by the user interface, the image data corresponding to the lighting selection.

20. The method of claim 11, wherein causing the light driver circuit to drive the at least one light source comprises causing the light driver circuit to drive a light emitting diode.

* * * * *